United States Patent [19]

Inuzuka

[11] Patent Number: 4,766,499

[45] Date of Patent: Aug. 23, 1988

[54] METHOD AND APPARATUS FOR ENCODING AND DECODING DITHER SIGNALS FOR REPRODUCTION OF THE HALFTONE OF A PICTURE

[75] Inventor: Tatsuki Inuzuka, Hitachi, Japan

[73] Assignee: Hitachi, Ltd., Tokyo, Japan

[21] Appl. No.: 72,165

[22] Filed: Jul. 10, 1987

[30] Foreign Application Priority Data

Jul. 10, 1986 [JP]  Japan ................................ 61-162225

[51] Int. Cl.$^4$ ...................... H04N 1/41; H04N 1/415; H04N 1/417
[52] U.S. Cl. .................................. 358/283; 358/260; 358/261; 358/282
[58] Field of Search ............... 358/260, 261, 282, 283, 358/280

[56] References Cited

U.S. PATENT DOCUMENTS

| | | | |
|---|---|---|---|
| 4,084,196 | 4/1978 | Tisue | 358/283 |
| 4,559,563 | 12/1985 | Joiner | 358/260 |
| 4,677,571 | 6/1987 | Riseman | 358/283 |

OTHER PUBLICATIONS

Omachi et al., "Modified Huffman Coding for Half-Tone Pictures," IEEE International Conference on Communications, Chicago, Jun. 23–26, 1985, *Conference Record ICC85*, pp. 1410–1414.

*Primary Examiner*—Howard W. Britton
*Attorney, Agent, or Firm*—Antonelli, Terry & Wands

[57] ABSTRACT

On the transmitting side of a facsimile system, a predictive picture signal $\hat{x}_{ij}$ of a pel (i, j) is obtained, taking account of predictive picture signals of pels prior to the pel (i, j), which have been previously obtained. A two-level transposition signal $d_{ij}$ is determined in accordance with the predetermined on the basis of an actual picture signal $x_{ij}$, the predictive picture signal $\hat{x}_{ij}$ and a dither threshold $t_{ij}$. The thus obtained transposition signal $d_{ij}$ is encoded by use of the MH or MR coding method and transmitted to a receiving side of the facsimile system. Compared with the conventional case, in which a dither signal $z_{ij}$ itself is encoded and transmitted, the transposition signal $d_{ij}$ can be considerably compressed, when it is encoded for transmission by use of the MH or MR coding method.

13 Claims, 11 Drawing Sheets

| 1 | 9 | 3 | 11 |
| 13 | 5 | 15 | 7 |
| 4 | 12 | 2 | 10 |
| 16 | 8 | 14 | 6 |

| 12 | 5 | 7 | 10 |
| 13 | 1 | 3 | 15 |
| 8 | 9 | 11 | 6 |
| 4 | 16 | 14 | 2 |

| 7 | 8 | 9 | 10 |
| 6 | 1 | 2 | 11 |
| 5 | 4 | 3 | 12 |
| 16 | 15 | 14 | 13 |

FIG. 5a
PICTURE SIG. $x_{ij}$

| | 1 | 2 | 3 | 4 | 5 | 6 | 7 | 8 |
|---|---|---|---|---|---|---|---|---|
| 1 | 3 | 4 | 5 | 6 | 7 | 8 | 8 | 7 |
| 2 | 3 | 4 | 5 | 7 | 8 | 9 | 8 | 7 |
| 3 | 4 | 5 | 5 | 6 | 8 | 10 | 9 | 8 |
| 4 | 5 | 5 | 5 | 7 | 9 | 10 | 11 | 9 |
| 5 | 5 | 5 | 6 | 8 | 10 | 11 | 12 | 10 |
| 6 | 5 | 5 | 6 | 7 | 9 | 10 | 10 | 9 |
| 7 | 4 | 5 | 5 | 6 | 8 | 9 | 9 | 8 |
| 8 | 3 | 4 | 5 | 5 | 7 | 8 | 8 | 7 |

FIG. 5b
THRESHOLD $t_{ij}$

| | 1 | 2 | 3 | 4 | 5 | 6 | 7 | 8 |
|---|---|---|---|---|---|---|---|---|
| 1 | 11 | 4 | 6 | 9 | 11 | 4 | 6 | 9 |
| 2 | 12 | 0 | 2 | 14 | 12 | 0 | 2 | 14 |
| 3 | 7 | 8 | 10 | 5 | 7 | 8 | 10 | 5 |
| 4 | 3 | 15 | 13 | 1 | 3 | 15 | 13 | 1 |
| 5 | 11 | 4 | 6 | 9 | 11 | 4 | 6 | 9 |
| 6 | 12 | 0 | 2 | 14 | 12 | 0 | 2 | 14 |
| 7 | 7 | 8 | 10 | 5 | 7 | 8 | 10 | 5 |
| 8 | 3 | 15 | 13 | 1 | 3 | 15 | 13 | 1 |

FIG. 5c
APPROX. SIG. $y_{ij}$

| | 1 | 2 | 3 | 4 | 5 | 6 | 7 | 8 |
|---|---|---|---|---|---|---|---|---|
| 1 | 7 | 7 | 4 | 6 | 7 | 7 | 7 | 7 |
| 2 | 7 | 7 | 6 | 6 | 7 | 7 | 7 | 7 |
| 3 | 5 | 6 | 6 | 6 | 7 | 10 | 9 | 8 |
| 4 | 5 | 6 | 6 | 6 | 7 | 9 | 9 | 9 |
| 5 | 5 | 6 | 6 | 6 | 7 | 8 | 9 | 9 |
| 6 | 5 | 6 | 6 | 6 | 7 | 8 | 9 | 9 |
| 7 | 5 | 6 | 6 | 6 | 7 | 8 | 9 | 9 |
| 8 | 5 | 6 | 6 | 6 | 7 | 8 | 9 | 9 |

FIG. 5d
DITHERED SIG. $z_{ij}$

$N_R : 37$
$A_C : 137$ (bits)

| | 1 | 2 | 3 | 4 | 5 | 6 | 7 | 8 |
|---|---|---|---|---|---|---|---|---|
| 1 | 0 | 1 | 0 | 0 | 0 | 1 | 1 | 0 |
| 2 | 0 | 1 | 1 | 0 | 0 | 1 | 1 | 0 |
| 3 | 0 | 0 | 0 | 1 | 1 | 1 | 0 | 1 |
| 4 | 1 | 0 | 0 | 1 | 1 | 0 | 0 | 1 |
| 5 | 0 | 1 | 1 | 0 | 0 | 1 | 1 | 1 |
| 6 | 0 | 1 | 1 | 0 | 0 | 1 | 1 | 0 |
| 7 | 0 | 0 | 0 | 1 | 1 | 1 | 0 | 1 |
| 8 | 1 | 0 | 0 | 1 | 1 | 0 | 0 | 1 |

FIG. 5e
1ST TRANSPOSITION SIG. $d_{ij}$

$N_R : 13$
$A_C : 55$ (bits)

| | 1 | 2 | 3 | 4 | 5 | 6 | 7 | 8 |
|---|---|---|---|---|---|---|---|---|
| 1 | 0 | 0 | 1 | 0 | 0 | 0 | 0 | 0 |
| 2 | 0 | 0 | 0 | 0 | 0 | 0 | 0 | 0 |
| 3 | 1 | 0 | 0 | 0 | 0 | 1 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

FIG. 5f
2ND TRANSPOSITION SIG. $d_{ij}'$

$N_R : 10$
$A_C : 46$ (bits)

| | 1 | 2 | 3 | 4 | 5 | 6 | 7 | 8 |
|---|---|---|---|---|---|---|---|---|
| 1 | 0 | 0 | 1 | 1 | 1 | 1 | 1 | 1 |
| 2 | 0 | 0 | 0 | 0 | 0 | 0 | 0 | 0 |
| 3 | 1 | 1 | 1 | 1 | 1 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

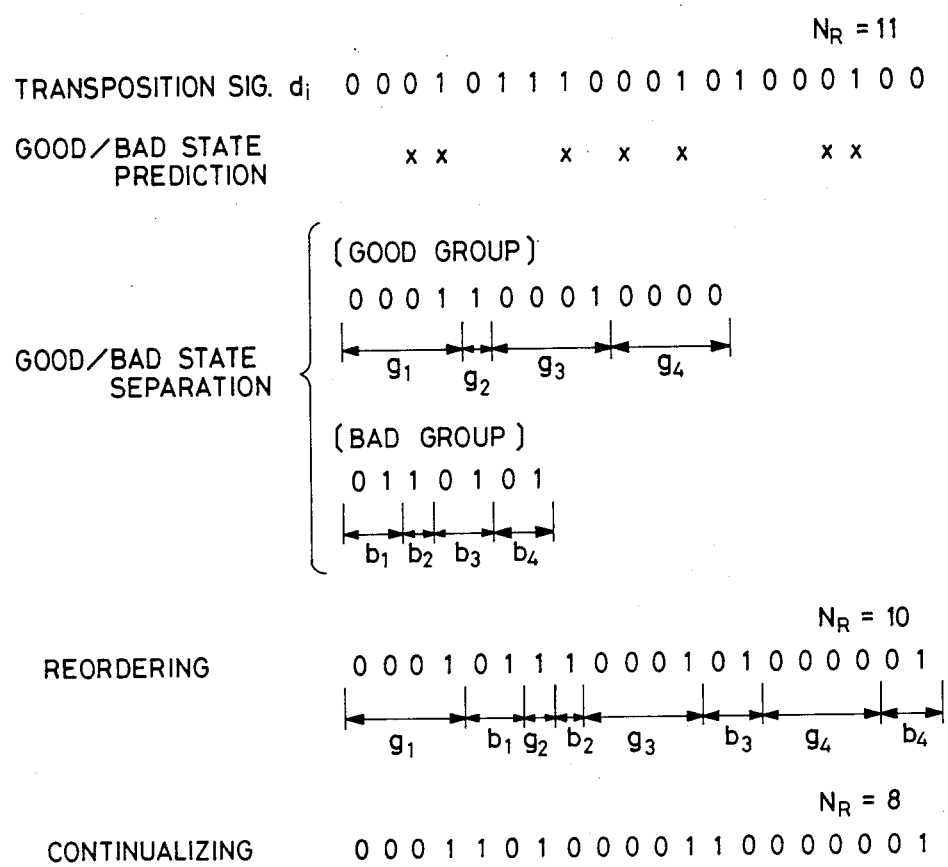

METHOD AND APPARATUS FOR ENCODING AND DECODING DITHER SIGNALS FOR REPRODUCTION OF THE HALFTONE OF A PICTURE

BACKGROUND OF THE INVENTION

1. Field of the Invention

The present invention relates to a method and apparatus thereof for encoding and decoding dither signals for reproduction of the halftone of a picture in the pseudo halftone, and more particularly to the improvement of the method and apparatus therefor capable of compressing the amount of data to be transmitted at the high compression efficiency.

2. Description of the Related Art

As is well known, a picture is indicated with the aggregation of pels in many types of picture indicating or reproducing apparatuses. In a facsimile device as a typical one of examples of such apparatuses, pseudo halftone indication using dithering technique is widely employed for reproduction of a halftone picture, because pels in the facsimile device can only indicate two levels of the tone, i.e., black and white.

In this technique, a series of multilevel picture signals $x_j$ of pels, which are obtained by scanning respective scanning lines, are binarized by using thresholds $t_j$ as follows. If $x_j \geq t_j$, a dither signal $z_j$ is made logical 1, whereas if $x_j < t_j$, $z_j$ is made logical zero. The thus obtained two-level dither signals are reproduced on a recording paper as black or white pels, wherein one of the two levels is reproduced as a black pel and the other level as a white pel. If the thresholds $t_j$ are altered pel by pel in accordance with a certain rule, the ratio of black and white pels within a constant area of a reproduced picture varies so that the area can be indicated in the desired halftone.

The thresholds are arranged in a matrix, each element of which corresponds to one pel of a picture, and different brightness levels as the thresholds are distributed element by element Such a matrix is known as a dither matrix. FIGS. 1a to 1c show three examples of a 4×4 dither matrix with 16 threshold levels. Numerals indicated in elements of the matrices represent brightness levels set as the thresholds. Hitherto there are known various types of distributing the thresholds. Dither matrices of FIGS. 1a and 1b are known as a Bayer type and a screen type, respectively A matrix of FIG. 1c has no specific name. Since, however, the 16 level thresholds are arranged in a vortex line, it can be called a vortex type or a centralized type. A type of the dither matrices is selected in accordance with the nature of an original picture to be processed.

By the way, in an actual picture, brightness levels of neighboring pels will vary continuously, and hence those pels have the high correlation in the brightness level to each other. As shown in FIGS. 1a to 1c, however, since the thresholds are determined irrespective of the correlation in brightness between pels in an original picture, dither signals $z_j$ of the neighbouring pels, which are obtained as the result of processing by using any of the dither matrices as mentioned above, have the less correlation to each other. The less correlation between the dither signals of the neighbouring pels results in considerably deteriorating the data compression efficiency, when the dither signals are encoded by a Modified Huffman coding method or a Modified READ coding method (called a MH coding method and a MR coding method, respectively, hereinafter), both of which can compress and encode the data for transmission by utilizing the high correlation between pels, and which are recommended by the International Telegraph and Telephone Consultative Committee (CCITT) as a standard coding method of two-level, i.e. black and white picture signals.

To overcome this problem, there is proposed a method as disclosed in the paper "MODIFIED HUFFMAN CODING FOR HALF-TONE PICTURES" by Takao Omachi et al, the conference record of the IEEE International Conference on Communications, 1985, pp 1410 to 1414. According to this paper, there is provided a preprocessor before a MH or MR coding apparatus in order to efficiently compress the dither signals, in which a dither signal $z_j$ of a pel j to be encoded at present is predicted by using the dither signals of pels which have been already encoded and transmitted prior to the prediction of the pel j.

In the prior art described above, the correlation between picture signals of pels must be obtained by the statistical measures in advance and stored as a table. Therefore, there occurs a new problem that the data compression efficiency varies to a great extent in accordance with the nature of a picture to be processed. Further, since, as seen from FIGS. 1a to 1c, the correlation between signals of pels is different every pattern of arranging the thresholds in the dither matrices, the statistical measures must be conducted by the number of times corresponding to the number of the dither matrices prepared, and also the tables for storing the results of the statistical measures must be provided as much.

SUMMARY OF THE INVENTION

An object of the present invention is to provide an improvement of a method and apparatus for encoding and decoding dither signals used for reproduction of the halftone of a picture to be processed in a pseudo halftone, whereby the amount of data to be transmitted from an encoding side to a decoding side can be considerably compressed at the high compression efficiency, irrespective of the kind of a dither matrix used for generation of the dither signals.

A feature of the present invention is in the following. There are provided the same dither thresholds $t_{ij}$ on both an encoding side and a decoding side. On the encoding side, a predictive picture signal $\hat{x}_{ij}$ of a pel of j-th column on i-th scanning line of an original picture is predicted taking account of pels prior to the pel (i, j), which have been already obtained. A transposition signal $d_{ij}$ of the pel (i, j) is produced in accordance with predetermined relations of the picture signal $x_{ij}$ of the pel (i, j) and the predictive picture signal $\hat{x}_{ij}$ thereof to the threshold $t_{ij}$ prepared for the pel (i, j). On the decoding side, an approximation signal $y_{ij}$ is generated in accordance with the predetermined relations on the basis of the transposition signal $d_{ij}$ transmitted from the encoding side and the thresholds $t_{ij}$. On the basis of the generated approximation signal $y_{ij}$ and the threshold $t_{ij}$, there is reproduced the dither signal $z_{ij}$ for the pel (i, j), by which the halftone of the original picture can be reproduced.

Although details will be described later, the transposition signals produced according to the present invention are much more suited for data compression, compared with the dither signals, which have been used for transmission in the prior art. As a result, the data compression efficiency is much improved.

BRIEF DESCRIPTION OF THE DRAWINGS

FIGS. 5a to 5g are drawings for explaining a concrete example of the signal processing according to the present invention;

FIG. 12 is a drawing for explaining a method of further enhancing the data compression efficiency.

DESCRIPTION OF THE PREFERRED EMBODIMENTS

First of all, the description will be made of the operational principle of a method according to the present invention, taking a facsimile system as a typical example.

Briefly speaking, in a facsimile system, an imaging device such as a charge coupled device scans an original picture and produces multilevel signals $x_j$ for respective pels successively, wherein the suffix j denotes the number of a pel on every scanning line. The multilevel signals $x_j$ are binarized by using dither thresholds $t_j$ so that dither signals $z_j$ are obtained for reproduction of the halftone of the original picture.

Figures 1A, 1B, 1C, 2:
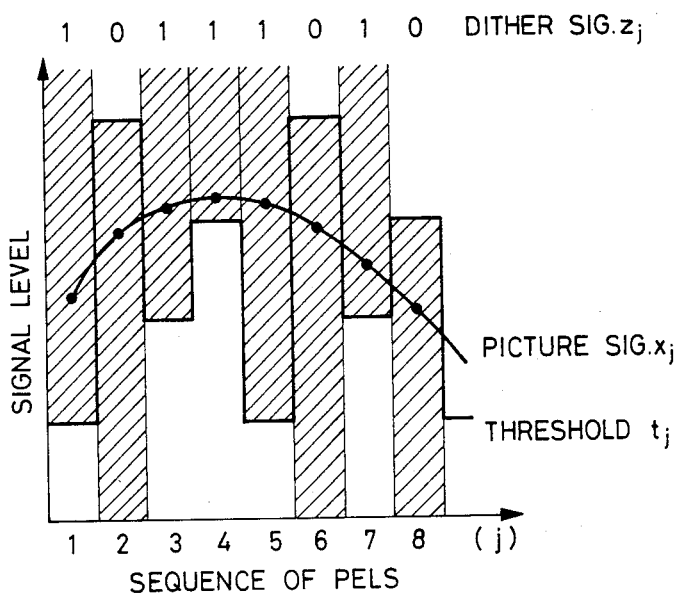
FIGS. 1a to 1c show examples of a dither matrix.
FIG. 2 is a drawing for explaining the relation of dither signals $z_j$ to picture signals $x_j$ and thresholds $t_j$ with respect to pels on a certain scanning line.

In the following, the generation of the dither signals and the nature thereof will be explained further in detail, referring to FIG. 2. In this figure, there are plotted picture signals $x_j$ (dots), which are obtained when a certain scanning line is scanned, with respect to the number j of pels on the scanned line, and thresholds $t_j$ (solid line) are shown, which are set for respective pels in advance. Further, an ordinate of a graph of the figure represents signal level corresponding to the brightness of pels.

Dither signals $z_j$ for respective pels are determined in accordance with the following relation of the picture signal $x_j$ of a pel j to a corresponding threshold $t_j$:

$$z_j = 1 \text{ if } x_j \geq t_j$$

$$z_j = 0 \text{ if } x_j < t_j \quad (1)$$

As apparent from the above relation, the dither signal $z_j$ does not represent any difference between $x_j$ and $t_j$, but only indicates the state which is larger. It is to be noted that an exact value of $x_j$ is not necessitated in order to preserve the information the dither signal $z_j$ has. For example, if only $x_j$ is equal to or larger than $t_j$, $z_j$ is 1, even though $x_j$ takes any value. Contrary, if only $x_j$ is smaller than $t_j$, $z_j$ takes 0, even though $x_j$ is of any value. Then, if a multilevel signal, which satisfies the relation of the formula (1), is defined as $y_j$, the region of values which $y_j$ can take is very wide, as indicated by hatched portions in FIG. 2.

By the way, in a conventional facsimile system, such dither signals are subjected to the MH coding, and the coded signals are transmitted from a transmitting side to a receiving side.

Now, it will be understood from the above description that if a predictive picture signal $\hat{x}_j$ of a certain pel j, which is included within the region of $y_j$, is identified, $\hat{x}_j$ can be used for generation of the dither signals $z_j$ in accordance with the formula (1), in place of the picture signal $x_j$. The condition mentioned above is expressed as follows;

$$y_j = \hat{x}_j \text{ if } x_j \geq t_j \text{ and } \hat{x}_j \geq t_j$$

$$y_j = \hat{x}_j \text{ if } x_j < t_j \text{ and } \hat{x}_j < t_j \quad (2)$$

Hereinafter, let us call the thus defined $y_j$ an approximation signal, because although $y_j$ is not a real picture signal, the information of $z_j$ can be still preserved thereby. Further, for pels, for which the picture signal $x_j$ and its predictive signal $\hat{x}_j$ don't satisfy the condition of the formula (2), the approximation signal $y_j$ can be given by the following formula (3);

$$Y_j = t_j + p \text{ if } x_j \geq t_j \text{ and } \hat{x}_j < t_j$$

$$Y_j = t_j + q \text{ if } x_j < t_j \text{ and } \hat{x}_j \geq t_j \quad (3)$$

wherein p is a positive constant and q a negative one, both being able to be selected arbitrarily.

If a following formula is defined by using $y_j$ obtained in accordance with the formulas (2), (3);

$$z_j = 1 \text{ if } y_j \geq t_j$$

$$z_j = 0 \text{ if } y_j < t_j \quad (4)$$

$z_j$ determined by the above formula (4) is equivalent to $z_j$ obtained by the formula (1).

Further, a two-level signal $d_j$ is defined as follows;

$$d_j = 0 \text{ if } x_j \geq t_j \text{ and } \hat{x}_j \geq t_j$$

$$d_j = 0 \text{ if } x_j < t_j \text{ and } \hat{x}_j < t_j$$

$$d_j = 1 \text{ if } x_j \geq t_j \text{ and } \hat{x}_j < t_j$$

$$d_j = 1 \text{ if } x_j < t_j \text{ and } \hat{x}_j \geq t_j \quad (5)$$

It will be understood from the formula (5) that the thus defined signal $d_j$ is available for determining whether the approximation signal $y_j$ can be obtained in accordance with the formula (2) or it should be calculated in accordance with the formula (3). Further, if the formulas (2), (3) are rewritten by using the signal $d_j$ as defined above, they are expressed as follows;

$$y_j = \hat{x}_j \text{ if } d_j = 0 \text{ and } \hat{x}_j \geq t_j$$

$$y_j = \hat{x}_j \text{ if } d_j = 0 \text{ and } \hat{x}_j < t_j$$

$$y_j = t_j + p \text{ if } d_j = 1 \text{ and } \hat{x}_j < t_j$$

$$y_j = t_j + q \text{ if } d_j = 1 \text{ and } \hat{x}_j \geq t_j \quad (6)$$

As apparent from the formula (6) above, in the case of $d_j = 0$, $y_j$ can be determined by $d_j$ only. In the case of $d_j = 1$, however, the relation of $\hat{x}_j$ and $t_j$ becomes necessary for selecting an equation for calculation of $y_j$.

Figure 3:
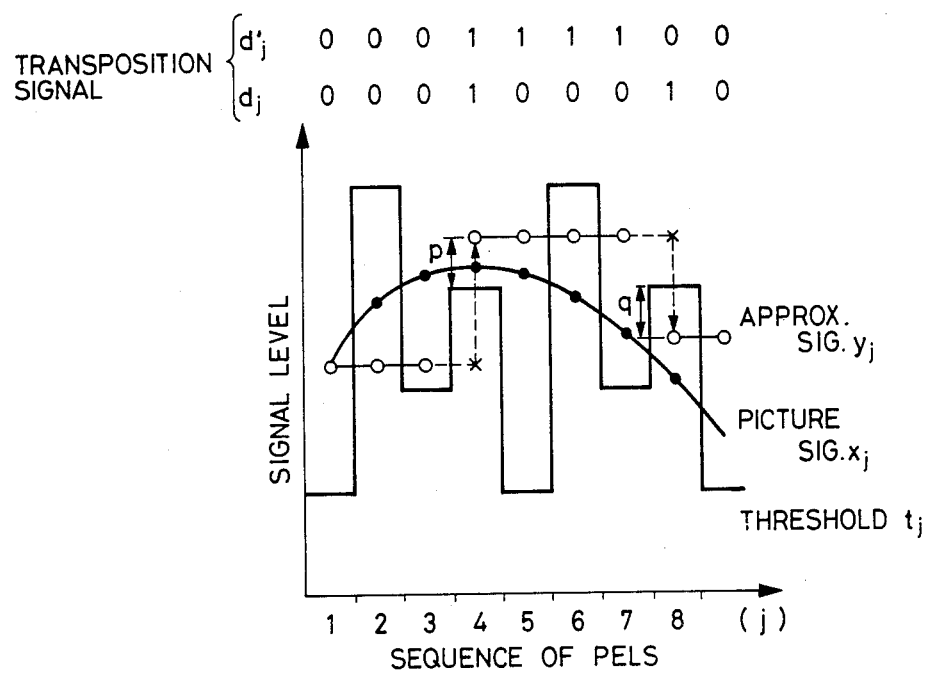
FIG. 3 is a drawing for explaining the operational principle of the present invention, in which there is shown the relation of transposition signals $d_j$ and $d_j'$ produced according to the present invention to picture signals $x_j$, approximation signals $y_j$ and thresholds $t_j$ with respect to pels on a certain scanning line.

In FIG. 3, there is shown the relation between the aforesaid two-level signal $d_j$ and the approximation signal $y_j$. If, as an initial value, a predictive picture signal $\hat{x}_1$ of the first pel is set as shown by a white dot in the figure, which, in this case, is equal to the picture signal $x_1$ of the first pel, the relations of $x_1 \geq t_1$ and $\hat{x}_1 \geq t_1$ are satisfied so that $d_1 = 0$ is selected in accordance with the first equation of the formula (5).

Next, a predictive picture signal $\hat{x}_2$ of the second pel has to be obtained. Although a method of prediction of $\hat{x}_j$ will be described later, let us assume in this example that the predictive picture signal of a prior pel is used as that of the next pel. Therefore, with respect to the second pel, the relations of $x_2 < t_2$ and $\hat{x}_2 < t_2$ are satisfied, so that $d_1 = 0$ is selected. Similarly, $d_1 = 0$ is selected also with respect to the third pel In the fourth pel, however, the relations of $x_4 \geq t_4$ and $\hat{x}_4 < t_4$ are established, since $\hat{x}_3$ is used as $\hat{x}_4$ (cf. a cross x in the figure) As a result, $d_4$ is made 1 in accordance with the third equation of the formula (5), and an approximation signal $y_4$ is calculated in accordance with the first equation of the formula (3). Also with respect to the fifth, sixth and seventh pels, $d_5$ to $d_7$ are obtained in the same manner as described in reference to the second and third pels and all become 0. Again in the eighth pel, $d_8$ is made 1, because $x_8 < t_8$ and $\hat{x}_8 \geq t_8$ are established by using $x_7$ as $x_8$, and $y_8$ is calculated in accordance with the second equation of the formula (3).

As apparent from FIG. 3, when $d_j = 1$, the approximation signal $y_j$ is obtained on the side opposite to the side of the predictive signal $\hat{x}_j$ with respect to the threshold $t_j$, in accordance with the formula (3). In other words, when $d_j = 1$, the predictive signal $\hat{x}_j$ is corrected to become the approximation signal $y_j$ in response to the relations of $x_j$, $\hat{x}_j$ to $t_j$. Therefore, $d_j$ is called a transposition signal, hereinafter. Although another transposition signal $d_j'$ is indicated in the figure, this will be referred to later.

Figure 4A:
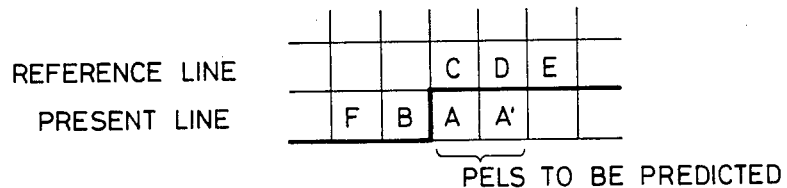
FIGS. 4a to 4b are drawings for explaining a method of obtaining and storing the approximation signals $y_j$.

In the following, the method of prediction of $\hat{x}_j$ will be explained. Briefly speaking, the prediction of a certain pel is carried out by using the approximation signals of prior pels which have been already obtained. In FIG. 4a, for example, the predictive picture signal $\hat{x}_A$ of a pel A is obtained in accordance with any of equations of the following formula (7) on the basis of some of the approximation signals $y_B$ to $y_F$ of pels C, D, E on a prior line as a reference and prior pels F, B on a present line;

$$\hat{x}_A = y_B$$

$$\hat{x}_A = (y_B + y_C)/2$$

$$\hat{x}_A = \{y_B + (y_C + y_D)/2\}/2 \quad (7)$$

In the example of FIG. 3, the first equation of the above formula was utilized in order to determine the predictive signal $\hat{x}_j$. Other possibility can be considered in order to determine the predictive signal $\hat{x}_j$, besides three equations of the formula (7), however the method of prediction can be freely chosen, depending on the need.

Further, in case the prediction is carried out with respect to a first scanning line, there is no reference line and hence the approximation signals corresponding to $y_C$ and $y_D$ are not available. Therefore, a phantom line is supposed, in which initial values are set for pels on the line. Similarly, the approximation signal corresponding to $y_B$ is not available, either, when the prediction is carried out with respect to a pel on a first column (a pel at the left-hand end on every line). In this case, the approximation signal of a pel, which is at the left-hand end on the preceding line, can be employed.

Figure 4B:
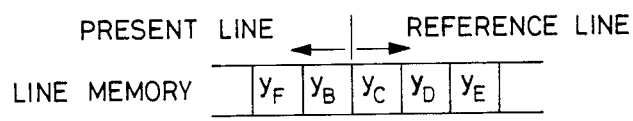

The operation of the formula (7) can be executed by providing a line memory as shown in FIG. 4b, which can store the approximation signals $y_j$ for one scanning line. Namely, the approximation signal $y_A$ is obtained in accordance with the formula (2) or (3) on the basis of the predictive signal $\hat{x}_j$ calculated by the formula (7), and then $y_C$ is replaced by the thus obtained $y_A$. The same operation is executed with respect to a next pel A' to be predicted and repeated until the calculation of the approximation signal is completed for all of the pels on one scanning line.

Returning to FIG. 3, as described above, the picture signals $x_j$ can be converted into the approximation signals $y_j$, which satisfy the condition of the formula (4), in accordance with the formula (2) or (3) on the basis of the picture signals $x_j$, their predictive signals and the thresholds $t_j$, and further the transposition signals $d_j$ can be obtained in accordance with the formula (5) on the basis of the same variables. On the contrary, if the thresholds $t_j$ and the method of prediction of $\hat{x}_j$ are known, the approximation signals $y_j$ can be obtained, when the transposition signals $d_j$ are given. The thus obtained approximation signals $y_j$ satisfy the condition of the formula (4), so that the dither signals $z_j$ can be reproduced.

From this fact, the following can be understood. In the facsimile system, if both a transmitting side and a receiving side are provided with the same thresholds $t_j$ (i.e., the same dither matrix) and the same method of prediction of $\hat{x}_j$, the approximation signals $y_j$ can be generated on the receiving side in accordance with the formula (6), if only the transposition signals $d_j$ are given from the transmitting side. The dither signals $z_j$ can be reproduced on the basis of the generated approximation signals $y_j$ and the thresholds $t_j$ in accordance with the formula (4). The dither signals $z_j$ themselves are not necessary to be communicated between both the transmitting and receiving sides.

By the way, as apparent from the first equation of the formula (5), $d_j$ becomes 0, if the predictive signal $\hat{x}_j$ coincides with the picture signal $x_j$. Therefore, in the case where the picture signals $x_j$ change slowly, the predictive picture signal $\hat{x}_j$ is apt to coincide with the picture signal $x_j$, so that the possibility of the continuous occurrence of $d_j=0$ is enhanced. This fact means that there is much improved the data compression efficiency in the MH or MR coding.

On the other hand, $d_j=1$ often occurs isolatedly or sporadically, because the approximation signal $y_j$ is obtained by correcting the predictive signal $\hat{x}_j$ in accordance with the last two equations of the formula (6) every time an error in the predictive signal $\hat{x}_j$ becomes large. If there often occurs the isolated 1 in the transposition signals $d_j$, the data compresson efficiency is very deteriorated due to the construction of codes, when such transposition signals $d_j$ are encoded by the MH or MR coding method.

To improve this, the transposition signals $d_j$ are subjected to the conversion processing, whereby code 0 in the transposition signals $d_j$ is turned to code 1 and vice versa every time 1 appears. As a result, the continuous occurrence of 0 or 1 is enhanced. If the MH or MR coding is executed on the thus converted transposition signals, the data compression efficiency is further improved. They are represented as $d_j'$ in FIG. 3, and will be called second transposition signals, hereinafter, whereas the original signals $d_j$ are called first transposition signals.

The second transposition signals $d_j'$ can be obtained by a flip-flop circuit from the first ones $d_j$. Namely, as shown in the first to third bits of $d_j$ in FIG. 3, during $d_j$ is 0, the flip-flop is maintained at the state of 0, whereby $d_j'$ as outputs of the flip-flop also become 0 for these bits. When $d_j$ becomes 1 at the fourth bit, the flip-flop is triggered to change its state from 0 to 1 and maintained at the state of 1 thereafter, as long as $d_j=0$ continues. When $d_j$ becomes 1 at the eighth bit, the flip-flop is turned to the state of 0.

way, the first transposition signals $d_j$ are converted into the second ones $d_j'$, as shown in FIG. 3. When the second transposition signals $d_j'$ are compared with the first ones $d_j$, the number of runs, during which the same codes, whether 0 or 1, continue, is three in the former, whereas that in the latter is five. Although details will be described later, the decrease of the number of runs results in the improvement of the data compression efficiency.

Referring to FIGS. 5a to 5g, in which a concrete example with numerical values is shown, the description will be done of the effect of the method according to the present invention.

In this example, a picture to be processed has 8×8 pels, as shown in the figure. In a picture signal matrix of FIG. 5a, a line number is indicated by i and a column number by j. Numeral values $x_{ij}$ in respective elements of the matrix represent the brightness levels of respective pels. The picture signal $x_{ij}$ is a 16 level signal in this example.

Further, transmitting and receiving sides are provided with the same 8×8 dither matrices $t_{ij}$ as shown in FIG. 5b, respectively. Signals $z_{ij}$, which are obtained by dithering the picture signals $x_{ij}$ with the dither matrix $t_{ij}$ in accordance with the formula (1), are shown in FIG. 5d. Conventionally, the dithered signals $z_{ij}$ as shown in FIG. 5d are directly encoded by means of the MH or MR coding method and transmitted from the transmitting side to the receiving side.

Figure 5G:
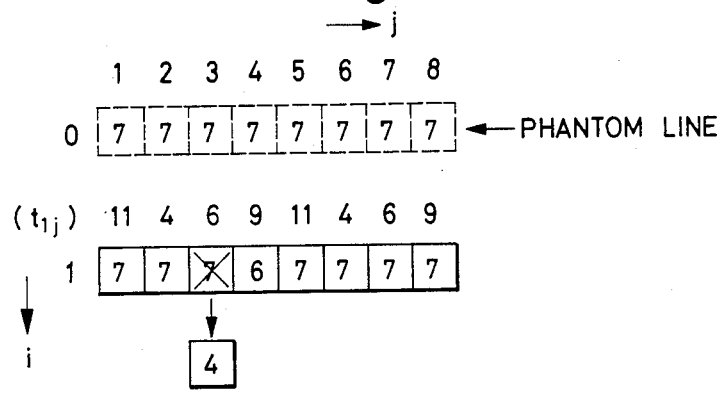

FIG. 5c shows a matrix of approximation signals $y_{ij}$, which are obtained on the basis of the picture signals $x_{ij}$ and the dither thresholds $t_{ij}$ as shown in FIGS. 5a and 5b, respectively. The method of obtaining the approximation signals $y_{ij}$ will be explained, referring to FIG. 5g. In this case, the signal processing is carried out line by line and never continues, extending over the next line.

At first, the various conditions for obtaining the approximation signals $y_{ij}$ are as follows. The prediction of $\hat{x}_{ij}$ was done in accordance with the second equation of the formula (7), which, if rewritten for this example, becomes as $\hat{x}_{ij}=(y_{i,j-1}+y_{i-1,j})/2$. Further, for the prediction of pels on the first line, a 0-th line (a phantom line) is supposed, and an initial value 7 was set for every column on the line, as shown in FIG. 5g. This initial value 7 was selected because of the middle of the 16 levels of the brightness. As a predictive signal $\hat{x}_{i1}$ of a pel in a first column on every line, the approximation signal $y_{i-1,1}$ for the pel in the first column on a line just before a corresponding line was used. Moreover, the constants p and q in the formulas (3), (6) were set at 2 and −2, respectively.

Referring now to FIG. 5g, $\hat{x}_{11}$ becomes 7, because $y_{01}$ (=7) is used therefor. At this time, since $x_{11}=3$ (cf. FIG. 5a) and $t_{11}=11$ (cf. FIG. 5b), the relations of $x_{11}<t_{11}$ and $\hat{x}_{11}<t_{11}$ are establish equal to $\hat{x}_{11}$, i.e. 7, in accordance with the second equation of the formula (2) (cf. FIG. 5c), and $d_{11}$ is made 0 in accordance with the second equation of the formula (5) (cf. FIG. 5e). Similarly $\hat{x}_{12}$ is predicted as being 7 in accordance with the aforesaid prediction equation of $\hat{x}_{ij}$ on the basis of $y_{11}$ (=7) and $y_{02}$ (=7). Since $x_{12}=4$ (cf. FIG. 5a) and $t_{12}=4$ (cf. FIG. 5b), the relations of $x_{12}\geq t_{12}$ and $\hat{x}_{12}\geq t_{12}$ are established, so that $y_{12}$ is made equal to $x_{12}$, i.e., 7, in accordance with the first equation of the formula (2) (cf. FIG. 5c), and $d_{12}$ is made 0 in accordance with the first equation of the formula (5) (cf. FIG. 5e).

Next, $\hat{x}_{13}$ is predicted as being 7 on the basis of $y_{12}$ (=7) and $y_{03}$ (=7). At this time, however, since $x_{13}=5$ (cf. FIG. 5a) and $t_{13}=6$ (cf. FIG. 5b), the relations of $x_{13}<t_{13}$ and $\hat{x}_{13}\geq t_{13}$ are established, so that $y_{13}$ must be calculated in accordance with the second equation of the formula (3). Accordingly, 4 is obtained by $t_{13}-2$ (cf. FIG. 5c). The predicted value 7 must be replaced by 4 calculated as above. Further, at this time, $d_{13}$ is made 1 in accordance with the fourth equation of the formula (5) (cf. FIG. 5e).

In the similar manner, $y_{14}$ to $y_{18}$ are calculated so that $y_{1j}$ for the first line can be obtained as shown in FIG. 5c. It will be understood from the foregoing description that, simultaneously with this, the first transposition signals $d_{1j}$ for the first line can be obtained as shown in FIG. 5e. The same operation is repeated for every line, so that the matrices of the approximation signals $y_{ij}$ and the first transposition signals $d_{ij}$ as shown in FIGS. 5c and 5e, respectively, are completed.

As already described, if a flip-flop circuit is operated by the first transposition signals $d_{ij}$ as shown in FIG. 5e, the second transposition signals $d_{ij}'$ as shown in FIG. 5f can be obtained as outputs of the flip-flop circuit. Referring to the first line in FIG. 5e, the flip-flop circuit turns its state in response to 1 at the third bit of $d_{ij}$ and changes its output from 0 to 1 (cf. FIG. 5f). Thereafter, since 0 continues in the following bits of $d_{ij}$ (cf. FIG. 5e), the state of the flip-flop circuit maintains its state at 1 (FIG. 5f).

In this manner, passing of the first transposition signals $d_{ij}$ through the flip-flop circuit results in that 1 occurring therein sporadically is continued in the following bits in the second transposition signals $d_{ij}'$. The same is applied to 0 sporadically occurring in $d_{ij}$. Therefore, the conversion of the first transposition signals $d_{ij}$ into the second ones $d_{ij}'$ can be called a continualizing operation. Further, the second transposition signals $d_{ij}'$ can be reconverted into the first ones $d_{ij}$ by the differentiating operation.

Comparing the first line in FIG. 5e with that in FIG. 5f, it will be seen that the number of runs decreases in the latter. Namely, the number of runs in FIG. 5e is three, whereas that in FIG. 5f is two. The same is true of the third line in both the figures, i.e., the number of runs in the third line in FIG. 5e is four, whereas that in FIG. 5f is reduced to half.

Let us make a comparison of the data compression efficiency in three cases, i.e., the coding for transmission of the dither signals $z_{ij}$ as shown in FIG. 5d, that of the first transposition signals $d_{ij}$ as shown in FIG. 5e and that of the second transposition signals $d_{ij}'$ as shown in FIG. 5f. Before the transmission, every signals $z_{ij}$, $d_{ij}$ and $d_{ij}'$ are subjected to the further code conversion for data compression by using a table of coding as shown below, for example.

TABLE 1

| Run length | Code for "white" run | Code for "black" run |
|---|---|---|
| 1 | 000111 | 010 |
| 2 | 0111 | 11 |
| 3 | 1000 | 10 |
| 4 | 1011 | 011 |
| 5 | 1100 | 0011 |
| 6 | 1110 | 0010 |
| 7 | 1111 | 00011 |
| 8 | 10011 | 000101 |

In the table above, "white" run means the continuous occurrence of code 0 in the respective matrices of $z_{ij}$, $d_{ij}$ and $d_{ij}'$, and "black" run means that of code 1. Further, as usual, the number of the same codes which continuously occur is defined as a run length.

Referring to FIG. 5e, for example, two of 0 at first occur continuously in the first line. This portion corresponds to the white run of the run length 2. For the transmission of this portion, the code "0111" (4 bits) is used, as shown in the table above. Next, there occurs a single bit of 1. This portion corresponds to the black run of the run length 1, and therefore the code "010" (3 bits) is used for the transmission of this portion. The remaining in the first line is the white run of the run length 5, and the code "1100" (4 bits) is used for the transmission of this portion.

As described above, the first line of FIG. 5e has three runs, i.e. two white runs and one black run, and the amount of codes to be transmitted is total 11 bits. In this line, the amount of codes to be transmitted becomes larger than 8 which is the original number of bits of the first line. In the second line, however, there exists only the white run of the run length 8, and therefore code to be used for the transmission of this line is "10011" (5 bits), as shown in the table above. Namely, 8 bits of the second line are compressed to 5 bits. In this way, if a code consisting of the smaller number of bits is assigned to a run which appears more frequently, the data compression efficiency becomes much higher.

The number of runs and the amount of codes counted with respect to $z_{ij}$, $d_{ij}$ and $d_{ij}'$ in the same manner as described above are indicated in FIGS. 5d to 5f as $N_R$ and $A_C$, respectively. It will be apparent therefrom that the amount of bits to be transmitted can be considerably compressed in $d_{ij}$, compared with $z_{ij}$. It is reduced to about 40% of that in $z_{ij}$. In $d_{ij}'$ the amount of bits to be transmitted can be further compressed to decrease to about 35% of that in $z_{ij}$.

Figure 6A:
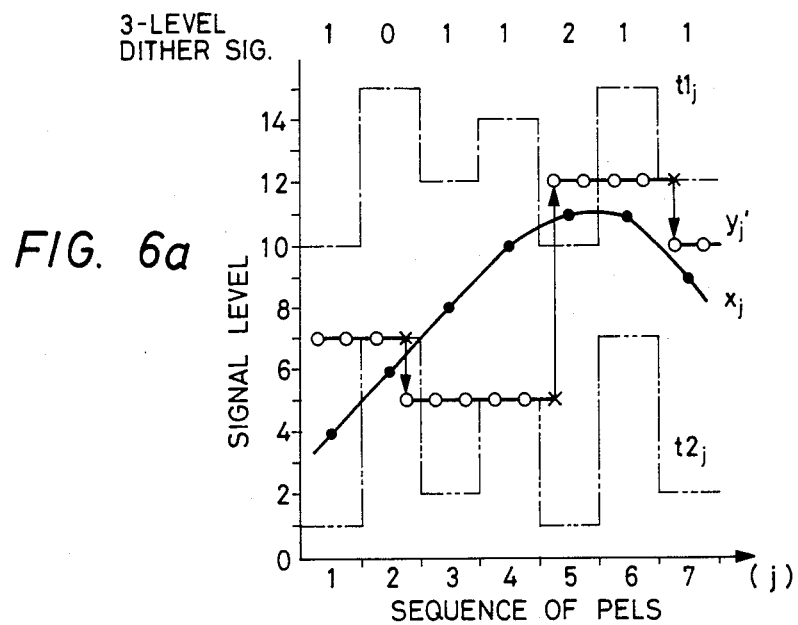
FIGS. 6a to 6b are drawings for explaining the applicability of the present invention to the case of a multilevel dither signal, in which two kinds of the thresholds are used.

In the foregoing description, a single dither threshold was set for each pel, and a dither signal was a two-level signal produced by comparing a picture signal with a corresponding dither threshold. The present invention, however, can be easily applied to the case of multilevel dither signals. As shown in FIG. 6a, for example, three-level dither signals $z_j$ are produced by using two dither thresholds $t1_j$ and $t2_j$ ($<t1_j$) in accordance with the following formula;

$$z_j = 2 \quad x_j \geq t1_j$$

$$z_j = 1 \quad t1_j > x_j \geq t2_j$$

$$z_j = 0 \quad t2_j > x_j \quad (8)$$

Further, in this case, a printer on a receiving side is necessary to be able to express three levels of tone for every pel. In such a printer, for example, a pel consists of plural dots, and a halftone in the pel can be expressed by changing the ratio of combining black and white dots.

Also in this case, two-level transposition signals $d_j$ can be obtained in the same manner as described in reference to the case of the two-level dither signals. In this case, however, there must be carried out two comparing operations for every pel, in which the two thresholds $t1_j$ and $t2_j$ are employed, respectively.

Namely, in the first comparison for the j-th pel, a first approximation signal $y1_j$ is obtained in accordance with the formula (2) or (3) on the basis of a picture signal $x_j$, its predictive signal $\hat{x}1_j$ and the threshold $t1_j$, and a first transposition signal $d1_j$ is obtained in accordance with the formula (5) on the basis of the same variables. Then, in the second comparison for the j-th pel, a second approximation signal $y2_j$ is obtained by using the same formulas on the basis of the picture signal $x_j$, its predictive signal $\hat{x}2_j$ and the threshold $t2_j$, and a second transposition signal $d2_j$ is obtained in accordance with the formula (5) on the basis of the same variables.

Further, in this example, as $\hat{x}1_j$ for the first comparison is used $y2_{j-1}$, which is a second approximation signal obtained in the second comparison of the (j−1)th pel just before the j-th pel, and as $\hat{x}2_j$ for the second comparison is used $y1_j$, i.e., the approximation signal in the first comparison of the j-th pel.

If the thus obtained approximation signals are plotted in the order of the first and then the second ones, i.e., . . ., $y1_{j-1}$, $y2_{j-1}$, $y1_j$, $y2_j$, $y1_{j+1}$, $y2_{j+1}$, . . ., as shown as $y_j'$ in FIG. 6a. Also, the two-level transposition signals can be obtained as shown in FIG. 6a (cf. bottom portion of the figure), in which they are plotted in the same manner as in $y_j'$, i.e., . . ., $d1_{j-1}$, $d2_{j-1}$, $d1_j$, $d2_j$, $d1_{j+1}$, $d2_{j+1}$, . . . . As apparent from the figure, there are two approximation signals $y1_j$, $y2_j$ and two transposition signals $d1_j$, $d2_j$ for every pel.

Figure 6B:
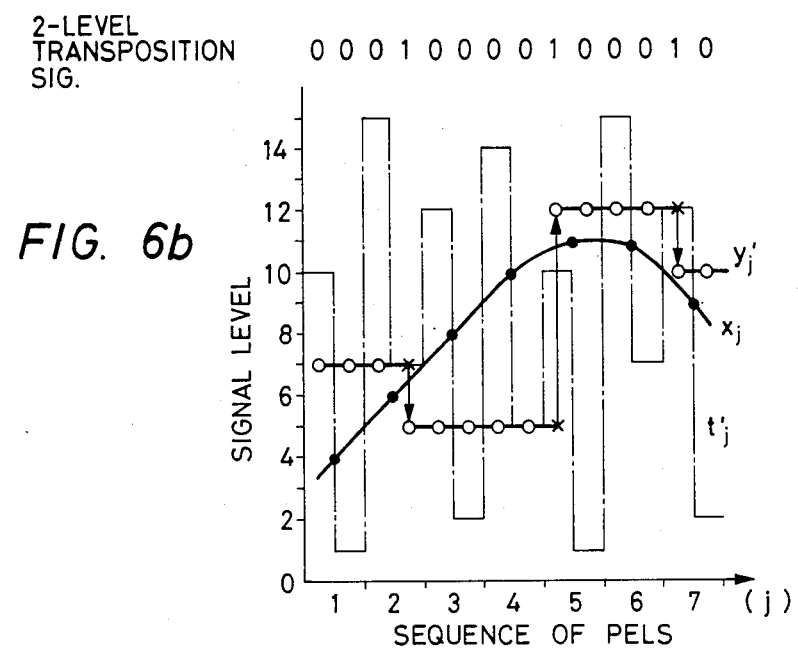

By the way, although there were the two separate thresholds $t1_j$, $t2_j$ for every pel in the example of FIG. 6a, the same two-level transposition signal can be got by modifying those thresholds $t1_j$, $t2_j$ to provide a single threshold $t_j'$ as shown in FIG. 6b. As apparent from the figure, the modified threshold $t_j'$ has two levels changing within one pel, wherein the level of the first half corresponds to the threshold $t1_j$ in FIG. 6a and the level of the second half to the threshold $t2_j$ in the same. The comparing operation is quite the same as that in FIG. 6a.

The transposition signals $d_j$ obtained in a transmitting side in the aforesaid manner are, directly or after being subjected to the continualization, encoded by means of the MH or MR coding method and transmitted to a receiving side. In the receiving side, the approximation signals $y_j'$ are reproduced in accordance with the formula (6) on the basis of the transmitted transposition signals $d_j$ and the thresholds $t1_j$, $t2_j$ (or the modified threshold $t_j'$). Further, the dither signals $z_j$ can be reproduced in accordance with the following formula on the basis of the reproduced $y_j'$;

$$z_j = 2 \text{ if } y1_j \geq t1_j \text{ and } y2_j > t2_j$$

$$z_j = 1 \text{ if } y1_j < t1_j \text{ and } y2_j \geq t2_j$$

$$z_j = 0 \text{ if } y1_j < t1_j \text{ and } y2_j < t2_j \tag{9}$$

As described above, according to the the present invention, the conversion of the dither signals into the form suitable for the coding for transmission can be carried out in accordance with the same method irrespective of the kinds of the dither matrices without providing any table for coping with the different statistical nature of pictures to be processed. Also in the case of the multilevel dither signals, the same method as in the two-level dither signals can be employed only using the simple additional measures as described above. The thus converted signals can be encoded at the high data compression efficiency by means of the MH or MR coding method, which, nowadays, is widely used as a standard coding method of the two-level picture signal.

Referring next to FIGS. 7 to 11, the description will be made of a system and apparatus according to an embodiment of the present invention. First of all, the whole configuration of a facsimile system as a typical example, to which the present invention can be applied, will be explained, in reference to FIG. 7, in which FIG. 7a shows the configuration of a transmitting side and FIG. 7b that of a receiving side.

Figure 7A:
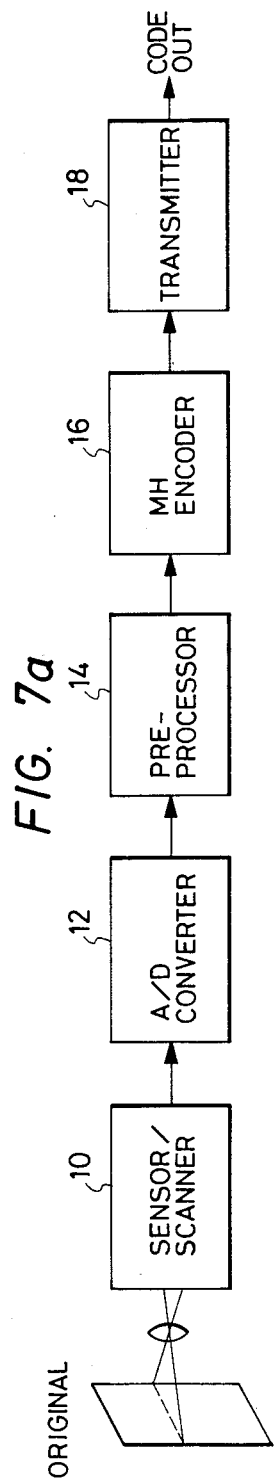
FIGS. 7a to 7b show an overall configuration of a facsimile system as a typical one of examples to which the present invention can be applied, the system including a preprocessor and a postprocessor for carrying out the signal processing in accordance with the present invention.
Figure 7B:
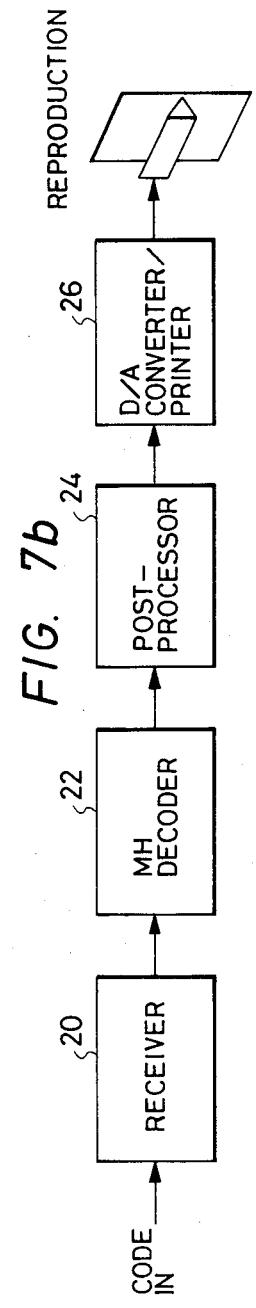

In FIG. 7a, a sensor/scanner 10 scans an original picture line by line to produce an analog picture signal pel by pel on the scanned line, which is converted into a digital signal by a A/D converter 12. Thus obtained picture signals are multilevel signals, and therefore, if the scanning and the A/D conversion are repeated with respect to the whole scanning lines of the original picture, a picture signal matrix as already shown in FIG. 5a can be obtained.

A preprocessor 14 carries out the aforesaid processing on the picture signals from the A/D converter 12 and produces the transposition signals, which are led to a MH encoder 16. In the encoder 16, the transposition signals are encoded into the codes suitable for transmission in accordance with the MH coding method, whereby, as already described, the encoded signals are considerably compressed in the amount of codes to be transmitted. The codes of the encoded transposition signals are transmitted by a transmitter 18 to a receiving side through an appropriate transmitting medium such as a telephone line.

The transmitted codes are received by a receiver 20 on the receiving side. The received codes are subjected to the decoding in a MH decoder 22 to be reconverted into the transposition signals. A postprocessor unit 24 carries out the already described processing on the basis of the reconverted transposition signals and reproduces dither signals for indication of the halftone of the picture. A D/A converter/printer 26 reproduces the picture on a recording paper in accordance with the thus reproduced dither signals.

As described above, the method according to the present invention is achieved in the preprocessor 14 and the postprocessor 24. Therefore, both the processors 14 and 24 will be described further in detail.

Figure 8:
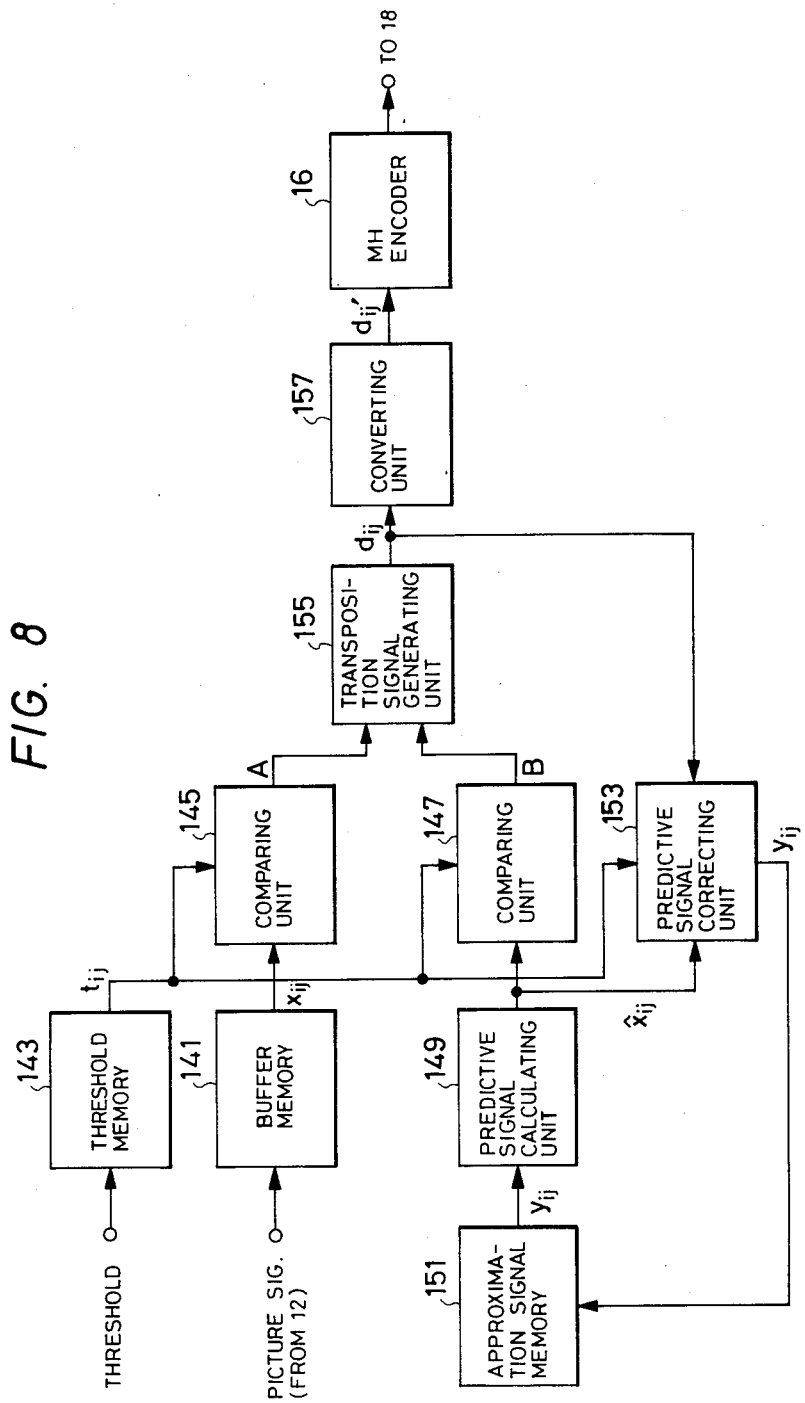
FIG. 8 is a block diagram schematically showing a preprocessor used on the transmitting side of the facsimile system of FIG. 7, in accordance with an embodiment of the present invention.

In FIG. 8, the multilevel picture signals $x_{ij}$ from the A/D converter 12 are sored temporarily in a buffer memory 141. The dither thresholds $t_{ij}$ are set in a threshold memory 143 in advance. The picture signals $x_{ij}$ and the corresponding dither thresholds $t_{ij}$ are read out successively to be supplied to a comparing unit 145, in which the comparing operation is carried out between $x_{ij}$ and $t_{ij}$ and, the unit 145 produces a logical output A, which, if $x_{ij} \geq t_{ij}$, takes 0 and otherwise 1.

In a comparing unit 147, on the other hand, the comparing operation is carried out between $\hat{x}_{ij}$ and $t_{ij}$, in which $\hat{x}_{ij}$ is given from a predictive signal calculating unit 149. The unit 147 produces a logical output B, which takes 0, if $\hat{x}_{ij} \geq t_{ij}$, and otherwise 1.

In the unit 149, the predictive signal $\hat{x}_{ij}$ is calculated in accordance with the formula (7). The calculated predictive signal $\hat{x}_{ij}$ is stored in an approximation signal memory 151 after it has been subjected to the correction in a predictive signal correcting unit 153. The function of the unit 153 will be explained later.

On the basis of the results A and B of the comparisons done in both the comparing units 145 and 147, a transposition signal generating unit 155 produces the transposrtion signals $d_{ij}$ in accordance with the following truth table;

TABLE 2

| A | B | $d_j$ |
|---|---|---|
| 0 | 0 | 0 |
| 0 | 1 | 1 |
| 1 | 0 | 1 |
| 1 | 1 | 0 |

It will be easily understood that the above truth table is determined in accordance with the formula (5). Further, as apparent from the truth table above, the unit 155 achieves the exclusive-OR operation.

The transposition signals generated in the unit 155 are the first transposition signals as already defined. The transposition signals $d_{ij}$ are given to a converting unit 157 as well as to the predictive signal correcting unit 153. In the unit 153, the predictive signal $\hat{x}_{ij}$ obtained in the calculating unit 149 is subjected to the correcting operation to be converted into the approximation signal $y_{ij}$ in accordance with the formula (6), using the thresholds $t_{ij}$ and the transposition signal $d_{ij}$.

The converting unit 157, such as a flip-flop circuit, converts the first transposition signals $d_{ij}$ into the second transposition signals $d_{ij}'$ as also defined already, and then they are encoded by the MH encoder 16.

Figure 9:
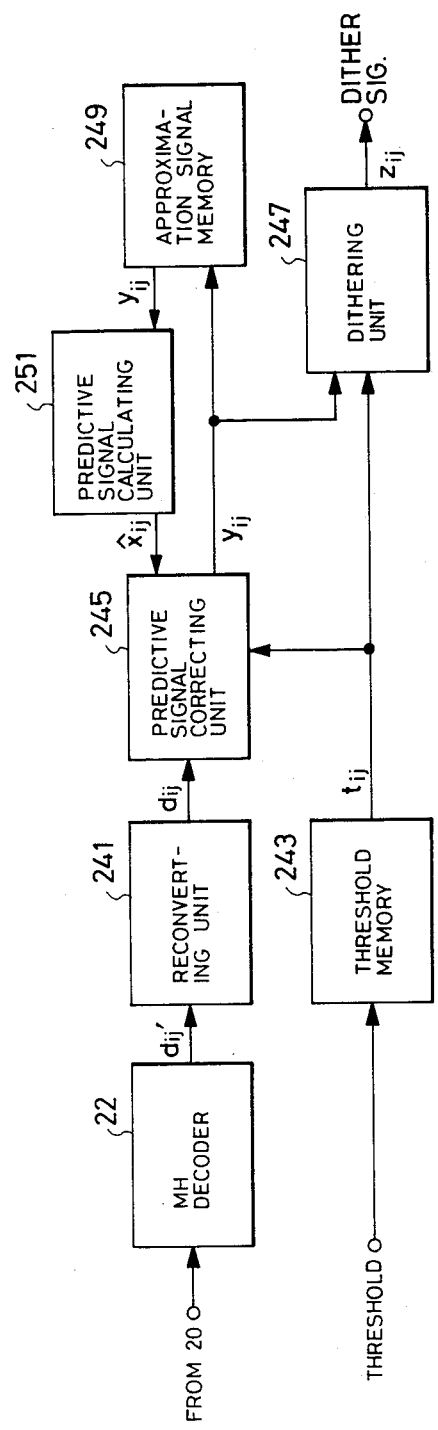
FIG. 9 is a block diagram schematically showing a postprocessor used on the receiving side of the facsimile system of FIG. 7, in accordance with the embodiment of the present invention.

Referring next to FIG. 9, the configuration of the receiving side will be explained. The received codes are decoded in the MH decoder 22 to become the second transposition signals $d_{ij}'$. The second transposition signals $d_{ij}'$ are reconverted into the first transposition signals $d_{ij}$ in a reconverting unit 241 which comprises the differentiating element. Also on the receiving side, the same thresholds $t_{ij}$ as on the transmitting side are provided in a threshold memory 243. A predictive signal correcting unit 245 receives the first transposition signals $d_{ij}$ reconverted and the thresholds $t_{ij}$ and produces the approximation signals $y_{ij}$ in accordance with the formula (6).

The thus produced approximation signals $y_{ij}$ are led to a dithering unit 247, in which the dither signals $z_{ij}$ are reproduced in accordance with the formula (4) on the basis of the received approximation signals $y_{ij}$ and the thresholds $t_{ij}$ read out from the threshold memory 243.

Further, the approximation signals $y_{ij}$ obtained in the unit 245 are also led to an approximation signal memory 249 and stored therein for usage in the calculation of the predictive signal $\hat{x}_{ij}$ in a predictive signal calculating unit 251.

Figure 10:
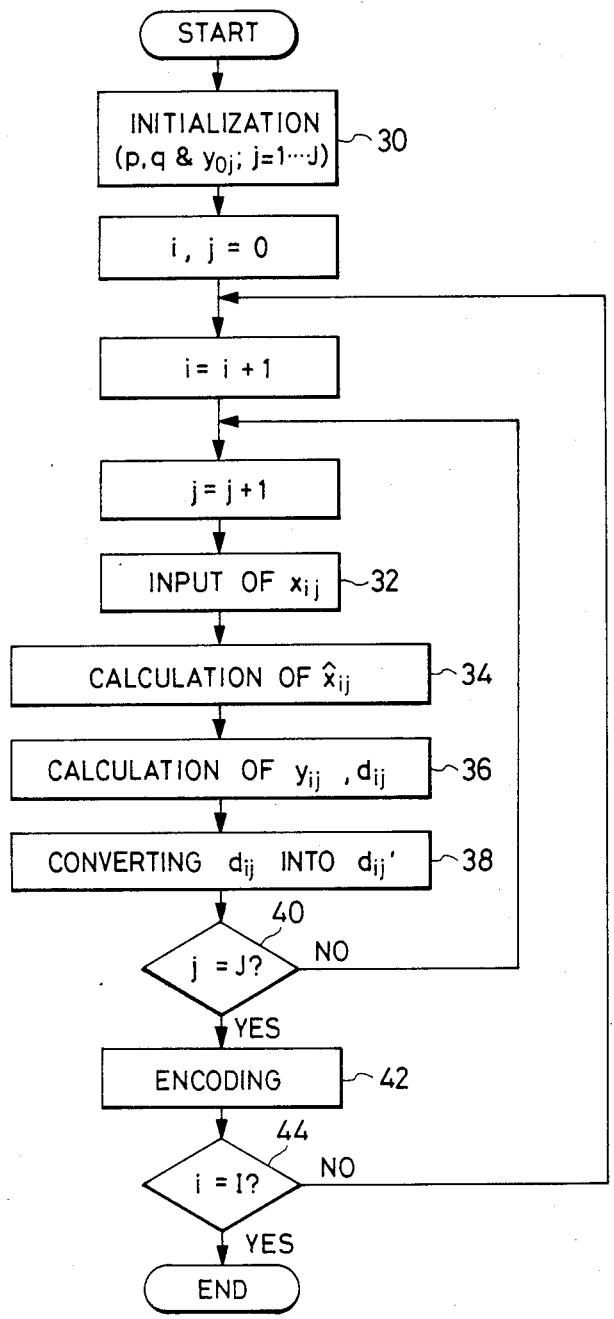
FIGS. 10 and 11 are flow charts for explaining the operation of the transmitting side and the receiving side in accordance with the present invention, respectively.
Figure 11:
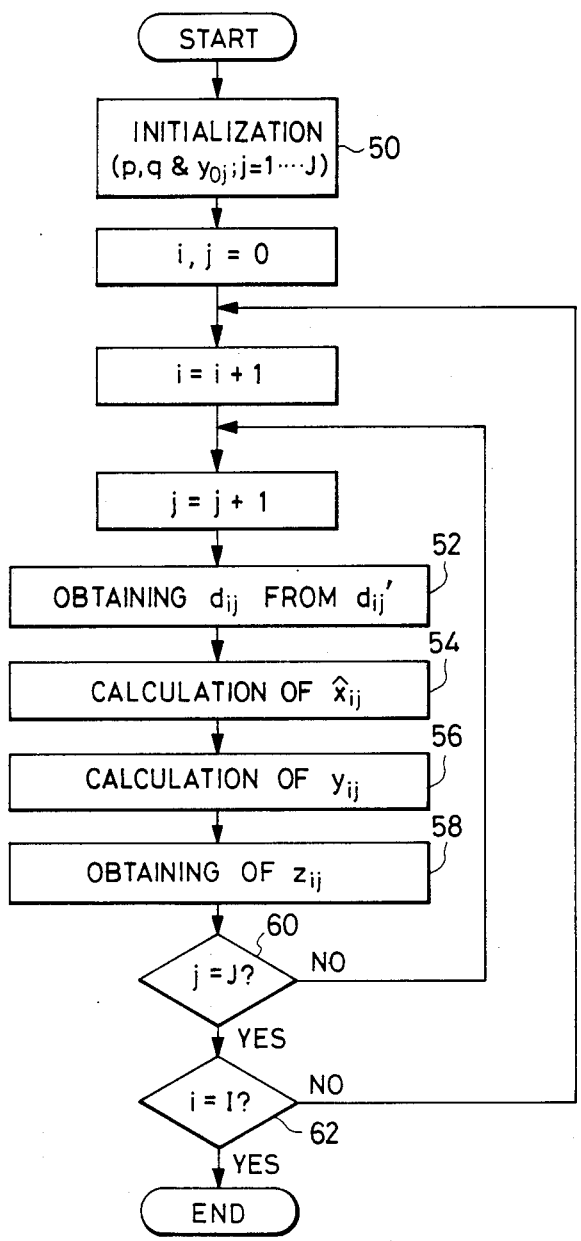

In FIGS. 8 and 9, the preprocessor 14 and the postprocessor 24 according to the present invention were embodied by apparatus composed of discrete units or devices. However, they can be also achieved by microprocessor units which are programed so as to perform the same operations. FIGS. 10 and 11 are flow charts showing the operations to be performed by such microprocessors. Fist of all, the operation of the microprocessor on the transmitting side will be described, referring to FIG. 10.

After start of the operation, the microprocessor is initialized at step 30. Namely, a phantom line before the first line is supposed and all pels on this line are set at initial values. Also at this step, there must be set values of p and q used in the formulas (3), (6). Next, at step 32, a picture signal $x_{11}$ of a pel of the first column on the first line is read into the processor from the buffer memory 141.

Then, at step 34, a predictive signal $\hat{x}_{11}$ is calculated in accordance with any of the equations of the formula (7). At step 36, the approximation signals $y_{11}$ and the first transposition signal $d_{11}$ are calculated in accordance with the formulas (2), (3) and (5) on the basis of $x_{11}$ and $\hat{x}_{11}$ as well as the threshold $t_{11}$ read out from the threshold memory 143. At step 38, the first transposition signal $d_{11}$ is converted into the second transposition signal $d_{11}'$, which is stored in an appropriate storage. At step 40, it is discriminated whether or not j reaches J (the whole number of the pels on one scanning line). The operation mentioned above is repeated until j becomes equal to J, i.e. obtaining of $d_{ij}'$ on the first line is completed.

When the second transposition signals $d_{ij}'$ are obtained with respect to the whole pels on the first line, they are encoded by means of the MH coding method at step 42, and the encoded signals are transmitted to the receiving side. At step 44, it is discriminated whether or not i reaches I (the whole number of the scanning lines of the picture to be processed). The operation mentioned above is repeated until i becomes I, i.e. obtaining of $d_{ij}'$ and encoding thereof are completed with respect to the whole lines of the picture.

Referring next to FIG. 11, the operation of the microprocessor on the receiving side will be explained. Similarly to the operation on the transmitting side, the microprocessor is at first initialized at step 50. Then, at step 52, the received second transposition signals $d_{ij}'$ is reconverted into the first ones $d_{ij}$. At step 54, the predictive signal $\hat{x}_{ij}$ is obtained.

For the pel of the first column on the first line, however, a value set as a initial one is used as $\hat{x}_{11}$. For pels succeeding thereto, $\hat{x}_{ij}$ is calculated in accordance with the equation of the formula (7) which is identical to that used for the calculation of $\hat{x}_{ij}$ in the transmitting side. At step 56, the approximation signals $y_{ij}$ are calculated in accordance with the formula (6) on the basis of the above calculated predictive signals $\hat{x}_{ij}$ and the first transposition signals $d_{ij}$. Then, at step 58, the dither signals $z_{ij}$ are obtained in accordance with the formula (4). According to the discriminating operation at steps 60 and 62, the operation mentioned above is repeated until it is completed with respect to the whole pels on the whole lines of the picture to be processed.

Referring to FIG. 12, the description will be made another method for further improving the data compression efficiency by adjusting the run lengths of the black runs and the white runs in the transposition signal. Let's consider the transposition signal $d_j$ as shown in the top of FIG. 12. In this transposition signal $d_j$, the number of runs is 11, as indicated as $N_R$ in the figure.

Figure 13:
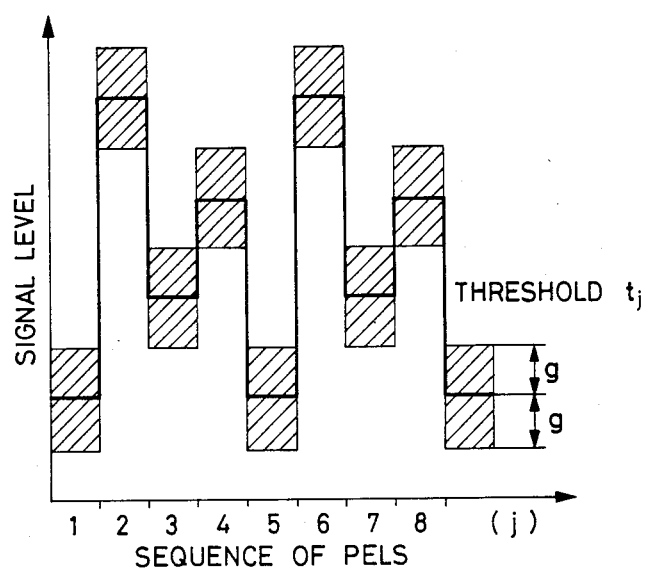
FIG. 13 is a drawing showing an example of the thresholds used in the method described with reference to FIG. 12.

Now, in course of the production of the transposition signal $d_j$, it is predicted whether, for every bit (pel), the possibility of $d_j=0$ is higher or that of $d_j=1$ is higher. This prediction is carried out as follows. For the threshold $t_j$ for every pel, a certain discriminating region determined by an arbitrarily selected constant g is set in advance, as shown by a hatched portion in FIG. 13, and the following prediction is carried out on the basis thereof;

if $|\hat{x}_j - t_j| \geq g$, "good state"

if $|\hat{x}_j - t_j| < g$, "bad state" (10)

wherein "good state" means that the j-th pel is highly possible to be 0, and "bad state" means that the j-th pel is highly possible to be 1. If $|\hat{x}_j - t_j|$ with respect to the j-th pel becomes equal to or larger than g, for example, it is predicted that there is the high possibility that the j-th pel becomes 0. This prediction is called a good/bad prediction. In FIG. 12, the results of the good/bad prediction executed on the respective pels (bits) are indicated by cross marks (x). The bits with x mark are bits which were predicted as "bad state".

Then, the bits of the transposition signal $d_j$ are grouped on the basis of the result of the good/bad prediction. The bits with x mark are collected as a bad group, and the remaining bits as a good group, as shown in the middle of the figure. In each group, the pels are further sectioned every first occurrence of code 1, and respective sections are named as $g_1$, $g_2$, $g_3$, $g_4$ in the good group and as $b_1$, $b_2$, $b_3$, $b_4$ in the bad group, as shown in the figure.

Next, the respective sections both in the good group and in the bad group are alternately arranged by turns, i.e., in such a manner as $g_1$, $b_1$, $g_2$, $b_2$, $g_3$, $b_3$, $g_4$, $b_4$, as shown in the figure As a result, codes in the respective bits of the original transposition signal $d_j$ are reordered. It will be seen from the figure that the number $N_R$ of runs decreases to 10 in the reordered transposition signal. Since the number of bits (pels) is not so large (20 bits) in this case, the effect of the reordering of the transposition signal $d_j$ is not so remarkable, either. However, the effect become remarkably large as the number of bits to be reordered is large.

Further, if the reordered transposition signal $d_j$ is subjected to the continualization as already described, the number $N_R$ of runs becomes further smaller, 8 in this example, as shown in the bottom of the figure.

As described above, according to the method and apparatus of the present invention, the dither signal for reproduction of a halftone picture in the pseudo halftone can be effectively compressed, with the result that there is brought about the advantageous effect in the reduction of transmitting time of picture data in a facsimile system or in the storing efficiency in a picture data filing system.

Further, the algorithm underlying the present invention does not depend on the kind of the dither matrix, or the pattern of distributing the dither thresholds. Accordingly, the dither matrix or the level of the pseudo halftone can be easily altered appropriately in response to the characteristics of printing or recording devices without requiring any change of the algorithm for encoding and decoding.

Moreover, signals obtained in accordance with the present invention can be easily subjected to the MH or MR coding method for transmission, which is widely adopted as the international standard coding method. Therefore, coding or decoding devices, which are employed in the present facsimile system, can be utilized, as they are, with the high data compression efficiency.

I claim:

1. A method for encoding and decoding dither signals for reproduction of the halftone of an original picture, in which there are provided the same dither thresholds on both an encoding side and a decoding side, picture signals, which are obtained pel by pel by scanning the original picture, are converted into signals for transmission by using the dither thresholds, on the encoding side, and the converted signals for transmission are reconverted into the dither signals by using the dither thresholds to reproduce the halftone of the picture, on the decoding side, characterized by the following steps;
on the encoding side,
first step of obtaining a predictive picture signal $\hat{x}_{ij}$ of a pel (i, j) of j-th column on i-th scanning line, taking account of predictive picture signals of pels prior to the pel (i, j), which have been already obtained;
second step of determining a two-level transposition signal $d_{ij}$ and calculating an approximation signal $y_{ij}$, in accordance with the predetermined relations of an actual picture signal $x_{ij}$ of the pel (i, j) and the predictive signal $\hat{x}_{ij}$ obtained in the first step to the thresholds $t_{ij}$ for the pel (i, j), the approximation signal $y_{ij}$ being available as the prior predictive picture signals in the first step for obtaining the predictive picture signal of a posterior pel; and
third step of encoding the transposition signals $d_{ij}$ obtained in the second step and transmitting them to the decoding side;
and, on the decoding side,
fourth step of obtaining the predictive picture signal $\hat{x}_{ij}$ of the pel (i, j), taking account of predictive signals of pels prior to the pel (i, j), which have been already obtained on the basis of the transposition signals previously transmitted;
fifth step of calculating an approximation signal $y_{ij}$ in accordance with the predetermined relation of the predictive signal $\hat{x}_{ij}$ of the pel (i, j) obtained in the fourth step to the thresholds $t_{ij}$ for the pel (i, j) and the transposition signal $d_{ij}$ transmitted from the encoding side; and
sixth step of reproducing a dither signal $z_{ij}$ in accordance with the predetermined relation of the approximation signal $y_{ij}$ to the dither threshold $t_{ij}$.

2. A method as defined in claim 1, wherein the transposition signal $d_{ij}$ is encoded for transmission by means of the Modified Huffman coding method.

3. A method as defined in claim 1, wherein the transposition signal $d_{ij}$ is encoded for transmission by means of the Modified READ coding method.

4. A method as defined in claim 1, wherein the predetermined relations for obtaining the transposition signal $d_{ij}$ on the encoding side are as follows;

$d_{ij}=0$ if $x_{ij} \geq t_{ij}$ and $\hat{x}_{ij} \geq t_{ij}$ $d_{ij}=0$ if $x_{ij} < t_{ij}$ and $\hat{x}_{ij} < t_{ij}$ $d_{ij}=1$ if $x_{ij} \geq t_{ij}$ and $\hat{x}_{ij} < t_{ij}$ $d_{ij}=1$ if $x_{ij} < t_{ij}$ and $\hat{x}_{ij} \geq t_{ij}$ and the predetermined relation for calculating the approximation signals $y_{ij}$ on the decoding side are as follows;

$y_{ij}=\hat{x}_{ij}$ if $d_{ij}=0$ and $\hat{x}_{ij} \geq t_{ij}$ $y_{ij}=\hat{x}_{ij}$ if $d_{ij}=0$ and $\hat{x}_{ij} < t_{ij}$ $y_{ij}=t_{ij}+p$ if $d_{ij}=1$ and $\hat{x}_{ij} < t_{ij}$ $y_{ij}=t_{ij}+q$ if $d_{ij}=1$ and $\hat{x}_{ij} \geq t_{ij}$ wherein p and q are positive and negative constants arbitrarily selected, respectively.

5. A method as defined in claim 4, wherein the transposition signal $d_{ij}$ obtained in the second step is subjected to the continualizing.

6. A method as defined in claim 4, wherein the transposition signal $d_{ij}$ obtained in the second step is subjected to the reordering by means of the good/bad state separation.

7. A method as defined in claim 6, wherein the reordered transposition signal $d_{ij}$ is further continualized.

8. An apparatus for encoding and decoding dither signals for reproduction of the halftone of an original picture, having, on an encoding side, means for scanning the original picture and producing multilevel picture signals pel by pel, a preprocessor for converting the picture signals into signals for transmission by using a dither matrix and means for encoding the signals converted by the preprocessor and transmitting the encoded signals, and on a decoding side, means for receiving and decoding the transmitted signals from the encoding side, a postprocessor for reconverting the decoded signals into the dither signals and means for reproducing the picture in accordance with the dither signals, characterized in that
the preprocessor comprises;
means for calculating a predictive picture signal $\hat{x}_{ij}$ of a pel (i, j) of j-th column on i-th scanning line, taking account of predictive signals of pels prior to the pel (i, j), which have been already obtained and stored;
means for storing a dither threshold $t_{ij}$ for the pel (i, j);
means for comparing an actual picture signal $x_{ij}$ with the dither threshold $t_{ij}$ read out from said storing means to produce a first comparison output;

means for comparing the predictive picture signal $\hat{x}_{ij}$ with the dither threshold $t_{ij}$ to produce a second comparison output;

means for generating a two-level transposition signal $d_{ij}$ in response to the logical operation of the first and second comparison outputs;

means for correcting the predictive picture signal $\hat{x}_{ij}$ in accordance with the predetermined relations of the actual picture signal $x_{ij}$ and the predictive picture signal $\hat{x}_{ij}$ to the threshold $t_{ij}$ to produce and store an approximation signal $y_{ij}$, which is available as the prior predictive picture signals for obtaining the predictive picture signal of a posterior pel; and means for encoding the transposition signal $d_{ij}$ and transmitting them to the decoding side, and the postprocessor comprises;

means for receiving the transmitted signals from the encoding side and decoding them into the transposition signal $d_{ij}$;

means for storing the same dither threshold $t_{ij}$ as in the preprocessor;

means for producing the approximation signal $y_{ij}$ in accordance with the predetermined relation of the predictive picture signal $\hat{x}_{ij}$ to the threshold $t_{ij}$ and the decoded transposition signal $d_{ij}$;

means for storing the produced approximation signals $y_{ij}$ for use in calculating the predictive picture signal of the next pel; and means for reproducing the dither signals $z_{ij}$ in accordance with the predetermined relation on the basis of the produced approximation signal $y_{ij}$ and the dither threshold $t_{ij}$.

9. An apparatus as defined in claim 8, wherein there is further provided, on the encoding side, means for converting the transposition signal $d_{ij}$ obtained by said generating means into a second transposition signal $d_{ij}'$ in which code 0 included therein is changed to code 1 and vice versa every time code 1 occurs in the transposition signal $d_{ij}$, and on the decoding side, means for reconverting the second transposition signal $d_{ij}'$ into the transposition signal $d_{ij}$ by the differentiating operation.

10. An apparatus as defined in claim 8, wherein the transposition signal $d_{ij}$ is encoded for transmisstion by means of the Modified Huffman coding method.

11. An apparatus as defined in claim 8, wherein the transposition signal $d_{ij}$ is encoded for transmission by means of the Modified READ coding method.

12. An apparatus as defined in claim 8, wherein, on the encoding side, the transposition signal $d_{ij}$ obtained by the generating means is subjected to the reordering of codes in accordance with a predetermined rule so that the same codes continue as much as possible, and, on the decoding side, the order of codes in the reordered transposition signal $d_{ij}$ is reconstructed to the order of codes in the original transposition signal $d_{ij}$ in accordance with the same rule as on the encoding side.

13. An apparatus as defined in claim 12, wherein there is further provided, on the encoding side, means for converting the reordered transposition signal $d_{ij}$ into a second transposition signal $d_{ij}'$, in which code 0 included therein is changed to code 1 and vice versa every time code 1 occurs in the reordered transposition signal $d_{ij}$, and on the decoding side, means for reconverting the second transposition signal $d_{ij}'$ into the reordered transposition signal $d_{ij}$ by the differentiating operation.

* * * * *